(12) United States Patent
Ohshima et al.

(10) Patent No.: US 11,060,892 B2
(45) Date of Patent: Jul. 13, 2021

(54) VORTEX FLOWMETER

(71) Applicant: CKD CORPORATION, Komaki (JP)

(72) Inventors: Yasushi Ohshima, Nagoya (JP); Yuki Sakaki, Owariasahi (JP); Takaharu Matsuura, Kasugai (JP); Ryo Eguchi, Ichinomiya (JP)

(73) Assignee: CKD CORPORATION, Komaki (JP)

( * ) Notice: Subject to any disclaimer, the term of this patent is extended or adjusted under 35 U.S.C. 154(b) by 0 days.

(21) Appl. No.: 16/644,827

(22) PCT Filed: Aug. 24, 2018

(86) PCT No.: PCT/JP2018/031316
§ 371 (c)(1),
(2) Date: Mar. 5, 2020

(87) PCT Pub. No.: WO2019/058868
PCT Pub. Date: Mar. 28, 2019

(65) Prior Publication Data
US 2021/0072051 A1    Mar. 11, 2021

(30) Foreign Application Priority Data
Sep. 25, 2017    (JP) .............................. JP2017-184187

(51) Int. Cl.
*G01F 1/32*    (2006.01)
(52) U.S. Cl.
CPC .......... *G01F 1/3209* (2013.01); *G01F 1/3263* (2013.01)

(58) Field of Classification Search
CPC ........ G01F 1/32; G01F 1/3209; G01F 1/3218; G01F 1/3245; G01F 1/3263
See application file for complete search history.

(56) References Cited

U.S. PATENT DOCUMENTS

| 4,926,695 A | 5/1990 | Kleven et al. |
| 5,247,838 A | 9/1993 | Vander Heyden et al. |
(Continued)

FOREIGN PATENT DOCUMENTS

| CN | 1032861 A | 5/1989 |
| JP | H03-500206 A | 1/1991 |
(Continued)

OTHER PUBLICATIONS

Dec. 17, 2018 Office Action issued in Japanese Patent Application No. 2017-184187.
(Continued)

*Primary Examiner* — Erika J Villaluna
(74) *Attorney, Agent, or Firm* — Oliff PLC (57) ABSTRACT

In this vortex flowmeter provided with a vortex generator and a flow rate measuring unit the flow rate measurement unit includes a piezoelectric element and a piezoelectric element case. The piezoelectric element case includes: a fitted part fitted in the body case; a pressure receiving part protruding out from a distal end face of the fitted part and placed in a body passage; a hollow portion formed along the axial direction of the piezoelectric element case in the fitted part to separate the fitted part and the pressure receiving part; and a slit formed inside of the pressure receiving part and configured to accommodate the piezoelectric element.

4 Claims, 7 Drawing Sheets (56) References Cited

U.S. PATENT DOCUMENTS

| | | | |
|---|---|---|---|
| 8,596,141 B2* | 12/2013 | Konyukhov | G01F 1/3245 |
| | | | 73/861.24 |
| 10,416,009 B1* | 9/2019 | Miller | G01F 15/185 |
| 2017/0097250 A1* | 4/2017 | Hirai | G01F 15/006 |
| 2019/0094054 A1 | 3/2019 | Lais et al. | |

FOREIGN PATENT DOCUMENTS

| | | |
|---|---|---|
| JP | 3456822 B2 | 10/2003 |
| JP | 3968769 B2 | 8/2007 |
| WO | 2017/153124 A1 | 9/2017 |

OTHER PUBLICATIONS

Sep. 18, 2018 International Search Report issued in International Patent Application No. PCT/JP2018/031316.
Mar. 31, 2020 International Preliminary Report on Patentability issued in International Patent Application No. PCT/JP2018/031316.
Oct. 9, 2020 Extended Search Report issued in European Patent Application No. 18858643.2.
Mar. 19, 2021 Office Action issued in Korean Patent Application No. 10-2020-7006367.
Mar. 8, 2021 Office Action issued in Chinese Patent Application No. 201880062039.2.

\* cited by examiner

VORTEX FLOWMETER

CROSS-REFERENCE TO RELATED APPLICATIONS

This is a US national phase application based on the PCT International Patent Application No. PCT/JP2018/031316 filed on Aug. 24, 2018, and claiming the priority of Japanese Patent Application No. 2017-184187 filed on Sep. 25, 2017, the entire contents of which are herewith incorporated by reference.

TECHNICAL FIELD

The present invention relates to a vortex flowmeter including a body case provided with a body passage, a vortex generator placed in the body passage, and a flow rate measuring unit placed downstream of the vortex generator and configured to detect a Karman vortex generated by the vortex generator to measure a flow rate.

BACKGROUND ART

Heat sources of a vacuum chamber, a quenching device, a laser processing machine, a chiller, and others are cooled by cooling water. In those devices, a flow rate sensor and a control valve are placed in a circulating circuit for the cooling water to regulate the flow rate of the cooling water to a set flow rate to control the temperature of the heat sources. For example, the flow rate sensor may be a low-cost vortex flowmeter.

For example, Patent Documents 1 and 2 each disclose a vortex flowmeter in which a vortex generator and a flow rate measuring unit are arranged in a flow passage formed in a body case. The body case is formed with an insertion hole for insertion of the flow rate measuring unit so as to communicate with the body passage. The flow rate measuring unit is provided with a fitted part fitted in the insertion hole of the body case, a pressure receiving part protruding from a distal end face of the fitted part into the body passage, and a piezoelectric element placed inside the pressure receiving part. In this vortex flowmeter, when the alternating stress of Karman vortices generated by the vortex generator acts on the pressure receiving part, causing the pressure receiving part to vibrate (undergo flexural deformation), the piezoelectric element that receives the vibration (the deformation) outputs a voltage signal.

RELATED ART DOCUMENTS

Patent Documents

Patent Document 1: JP Patent No. 3456822
Patent Document 2: JP Patent No. 3968769

SUMMARY OF INVENTION

Problems to be Solved by the Invention

However, in the conventional vortex flowmeter, the pressure receiving part protruding from the distal end face is short. Therefore, when a fluid to be measured, or a measured fluid, flows at a low flow rate in the body passage, the pressure receiving part may not vibrate even if the alternating stress of Karman vortex or vortices acts on the pressure receiving part. Thus, the piezoelectric element could not output a voltage signal. If the length of the pressure receiving part protruding from the distal end face is designed longer, the pressure receiving part is likely to vibrate (undergo deformation) in response to Karman vortices, leading to enhanced sensitivity of the piezoelectric element. However, such a configuration leads to an increase in length of the flow rate measuring unit in its axial direction, resulting in an increase in size of the vortex flowmeter.

The present invention has been made to solve the above problems and has a purpose to provide a vortex flowmeter capable of enhancing the flow rate measuring accuracy while suppressing an increase in size.

Means of Solving the Problems

To achieve the above purpose, one aspect of the invention provides the following configuration. (1) Specifically, a vortex flowmeter comprises: a body case including a body passage; a vortex generator placed in the body passage; and a flow rate measuring unit placed downstream of the vortex generator and configured to detect a Karman vortex generated by the vortex generator to measure a flow rate. The flow rate measuring unit includes: a piezoelectric element and a piezoelectric element case, and the piezoelectric element case comprises: a fitted part fitted in the body case; a pressure receiving part protruding out from a distal end face of the fitted part, the distal end face being located close to the body passage, so that the pressure receiving part is placed inside the body passage; a hollow portion formed in the fitted part along an axial direction of the piezoelectric element case to separate the fitted part and the pressure receiving part from each other; and a slit provided inside the pressure receiving part and configured to accommodate the piezoelectric element.

The vortex flowmeter configured as above can be provided with the pressure receiving part having the length elongated owing to the hollow part without changing the protruding length of the pressure receiving part from the distal end face of the fitted part. Accordingly, even when the measured fluid flows at a low flow rate and the alternating stress of the Karman vortex is small, the pressure receiving part is easy to vibrate (undergoes flexural deformation) in response to the Karman vortex generated by the vortex generator, enabling the piezoelectric element to detect the Karman vortex. According to the vortex flowmeter configured as above, the piezoelectric element case simply provided with the hollow portion enables the sensitivity of the piezoelectric element to be enhanced. This configuration can enhance the flow rate measuring accuracy while suppressing an increase in size.

(2) In the vortex flowmeter described in (1), preferably, the body case includes an insertion hole in which the flow rate measuring unit is inserted, the vortex flowmeter includes a seal member mounted to seal between the body case and the flow rate measuring unit, and the hollow portion is located more radially inside than a mounting position of the seal member.

In the foregoing vortex flowmeter, the stress of the seal member is blocked and not transmitted to the pressure receiving part. Thus, the flow rate measuring unit can detect Karman vortex without being affected by the stress of the seal member.

(3) In the vortex flowmeter described in (1) or (2), preferably, the piezoelectric element case includes a pair of ribs provided across the hollow portion, and the pair of ribs are arranged along an axial direction of the body passage.

In the foregoing vortex flowmeter, when the pressure receiving part vibrates in response to the Karman vortex, the pair of ribs stretches the pressure receiving part to limit an amplitude of vibration (a deformation amount) of the pressure receiving part. This configuration can prevent resonance of the pressure receiving part and enhance the flow rate measuring accuracy.

EFFECTS OF THE INVENTION

According to the present invention, therefore, the vortex flowmeter can be provided capable of enhancing the flow rate measuring accuracy while suppressing an increase in size.

MODE FOR CARRYING OUT THE INVENTION

An embodiment of a vortex flowmeter according to the present invention will be described below referring to the accompanying drawings.

Figure 1:
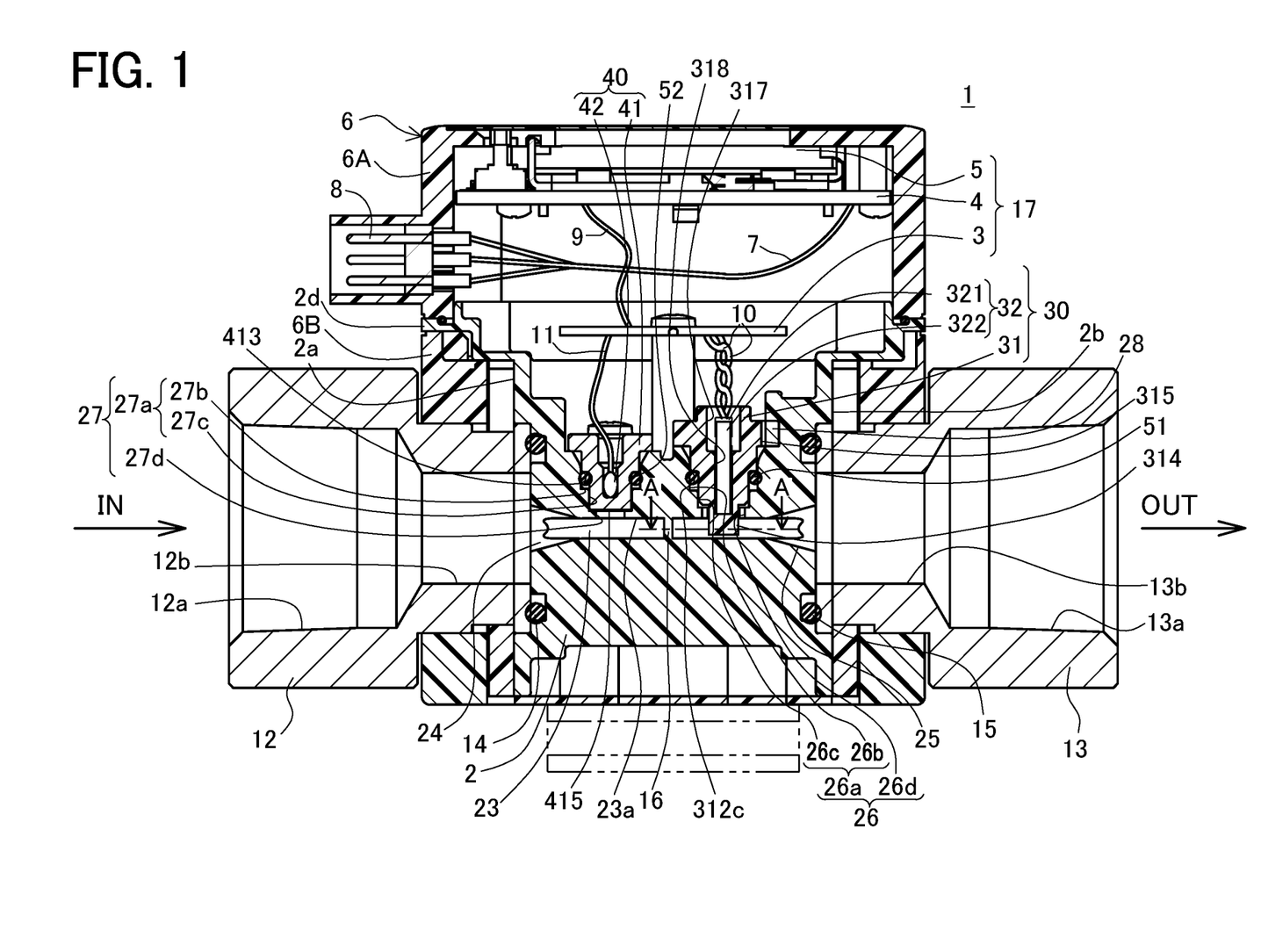
FIG. 1 is a cross-sectional view of a vortex flowmeter in an embodiment of the present invention.

FIG. 1 is a cross-sectional view of a vortex flowmeter 1 in the embodiment of the present invention. As shown in FIG. 1, the vortex flowmeter 1 includes a body case 2 and a controller 17 which are housed in a casing 6. The body case 2 has a nearly rectangular parallelepiped shape having a first surface 2a and a second surface 2b, which are opposed to each other, to which a first joint 12 and a second joint 13 are respectively connected through O-rings 14 and 15.

In the vortex flowmeter 1, there are coaxially provided a first port 12a and a first passage 12b each formed in the first joint 12 located on an input side (an upstream side), a first nozzle portion 24 and a body passage 23 and a second nozzle portion 25 which are formed in the body case 2, and a second port 13a and a second passage 13b each formed in the second joint 13 located on an output side (a downstream side). The body case 2 is provided with a temperature sensing element 40, a vortex generator 16, and a flow rate measuring unit 30, which are arranged along the body passage 23 in order from the upstream side (the side connected to the first joint 12). It is to be noted that the body case 2 and the casing 6 are made of corrosive-resistant and high-strength resin. The first joint 12 and the second joint 13 are made of metal.

The vortex generator 16 has a columnar shape extending in a direction (a vertical direction in FIG. 1) perpendicular to an axial direction (a horizontal direction in FIG. 1) of the body passage 23. This vortex generator 16 is formed integral with the body case 2.

Figure 2:
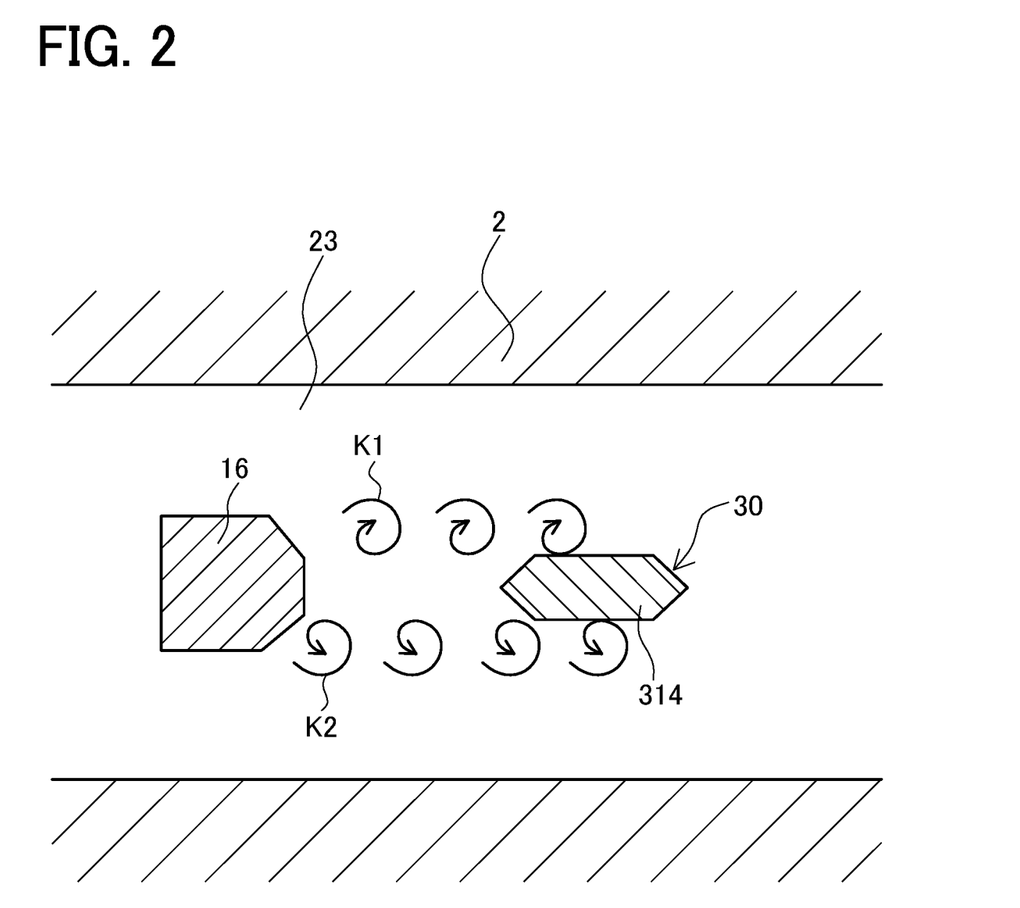
FIG. 2 is a fragmentary view taken along A-A in FIG. 1.

FIG. 2 is a cross-sectional view taken along A-A in FIG. 1. The vortex generator 16 has a hexagonal cross-section taken along the axial direction of the body passage 23 and is configured to generate Karman vortices K1 and K2 asymmetrically in a fluid to be measured (i.e., a measured fluid) flowing from the input side (the first joint 12 side). The flow rate measuring unit 30 is configured to detect the Karman vortices K1 and K2 based on the alternating stress of the Karman vortices K1 and K2 acting on a pressure receiving part 314 and measure a flow rate of the measured fluid.

Returning to FIG. 1, the body case 2 is formed with a first insertion hole 27 and a second insertion hole 26, which open in the surface (a top surface in FIG. 1) on the side close to the controller 17. The first insertion hole 27 is located in a position upstream of the vortex generator 16 and communicates with the body passage 23. The temperature sensing element 40 has a distal end face 415 located on the side close to the body passage 23 and is inserted in the first insertion hole 27 and fastened to the body case 2 with screws so that the distal end face 415 does not protrude into the body passage 23. The second insertion hole 26 is located in a position downstream of the vortex generator 16 and communicates with the body passage 23. The flow rate measuring unit 30 is inserted in the second insertion hole 26 and fastened to the body case 2 with screws so that the pressure receiving part 314 provided at the distal end of the flow rate measuring unit 30 protrudes into the body passage 23.

The flow rate measuring unit 30 includes a piezoelectric element case 31 and a piezoelectric element 32 accommodated in this case 31. The piezoelectric element 32 includes a reed-shaped piezoelectric plate 322 one end of which is connected to an electrode part 321. The piezoelectric element 32 is configured to output a voltage from the electrode part 321 according to the strain deformation of the piezoelectric plate 322. The piezoelectric element 32 is adhered to the piezoelectric element case 31 with an ultraviolet cure adhesive while the piezoelectric plate 322 is inserted in a slit 318 formed in the center of the piezoelectric element case 31 along its axial direction and the electrode part 321 is placed in a large-diameter hole 317 provided at an open end of the slit 318.

Figure 3:
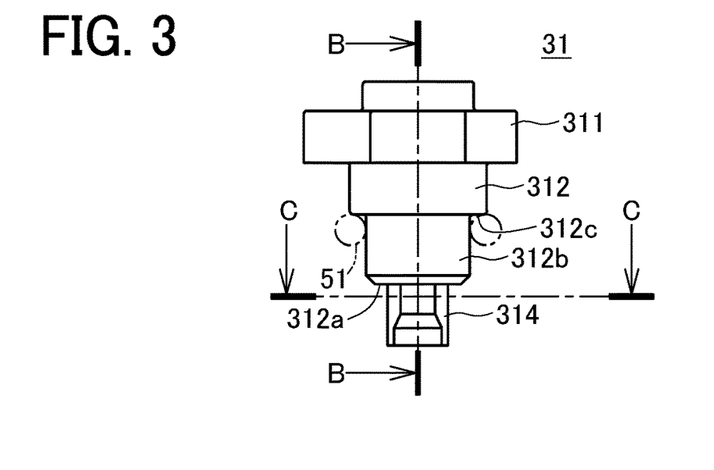
FIG. 3 is a front view of a piezoelectric element case.
Figure 4:
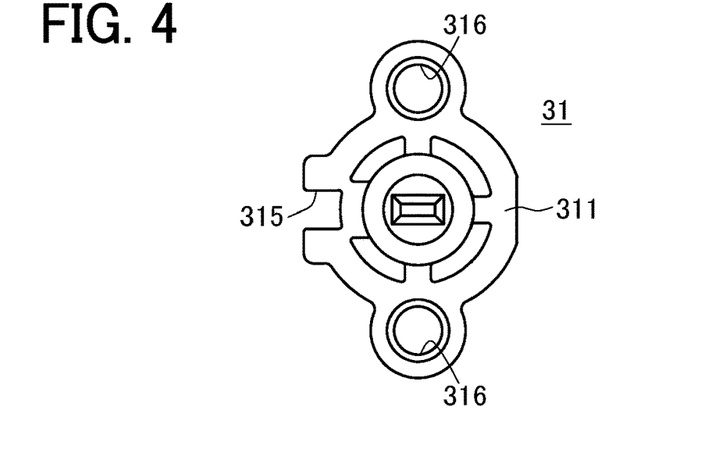
FIG. 4 is a top view of FIG. 3.
Figure 5:
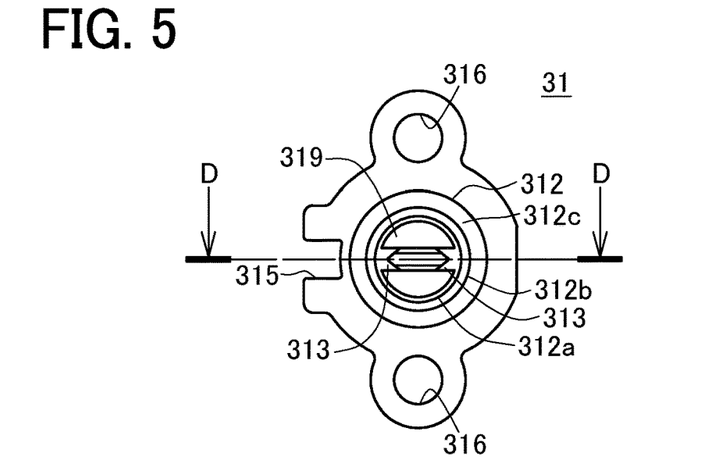
FIG. 5 is a bottom view of FIG. 3.
Figure 6:
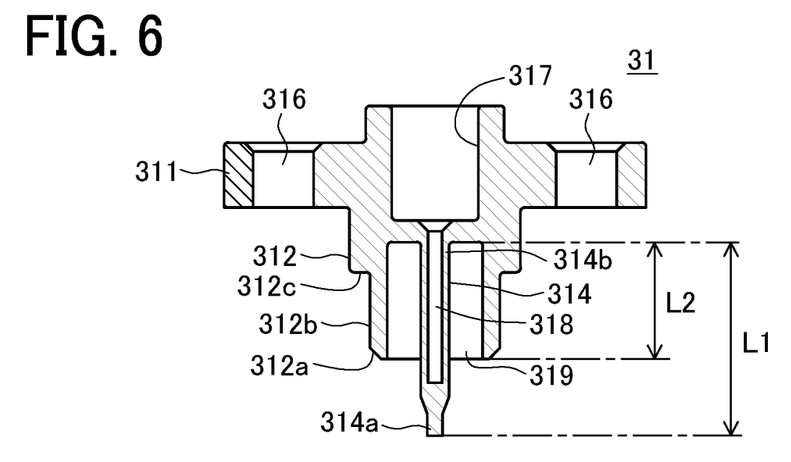
FIG. 6 is a cross-sectional view taken along B-B in FIG. 3.
Figure 7:
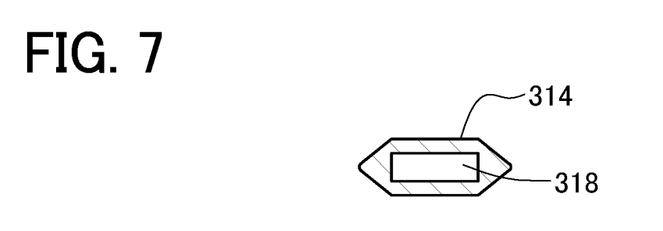
FIG. 7 is a cross-sectional view taken along C-C in FIG. 3.
Figure 8:
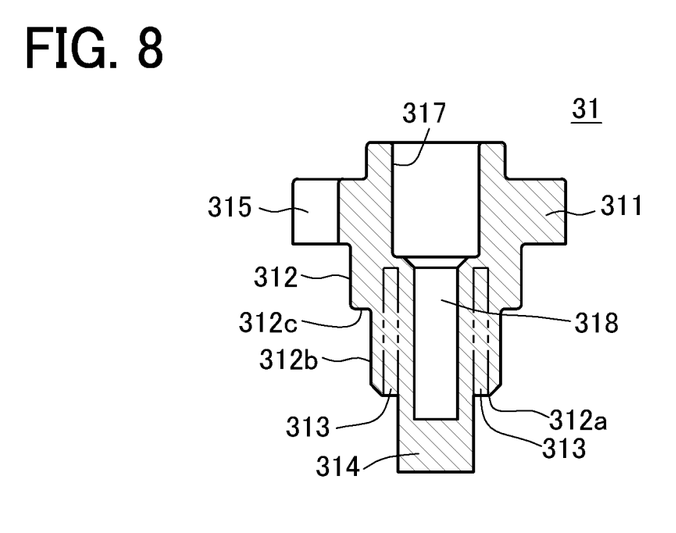
FIG. 8 is a cross-sectional view taken along D-D in FIG. 5.

The piezoelectric element case 31 is made of resin containing no glass fiber and formed in such a shape as shown in FIGS. 3 to 8. FIG. 3 is a front view of the piezoelectric element case 31. FIG. 4 is a top view of FIG. 3. FIG. 5 is a bottom view of FIG. 3. FIG. 6 is a cross-sectional view taken along B-B in FIG. 3. FIG. 7 is a cross-sectional view taken along C-C in FIG. 3. FIG. 8 is a cross-sectional view taken along D-D in FIG. 5.

As shown in FIG. 3, the piezoelectric element case 31 includes a fitted part 312, the pressure receiving part 314, and a flange 311.

As shown in FIGS. 3 and 5, the fitted part 312 has a columnar shape. The fitted part 312 is provided, as its end portion (a lower end portion in FIG. 3) located on the side close to the body passage 23, with a small-diameter portion 312b having a small diameter. Thus, a step portion 312c is circumferentially formed along the outer peripheral surface of the fitted part 312. As shown in FIG. 3, in the fitted part 312, the small-diameter portion 312b is mounted with an annular seal member 51, the movement of which is limited by the step portion 312c.

As shown in FIG. 3, the pressure receiving part 314 protrudes out from a distal end face 312a (a lower end face in FIG. 3) of the fitted part 312, located on the side close to the body passage 23, in the axial direction. As shown in FIG.

7, the pressure receiving part 314 has a plate shape having a hexagonal cross-section taken in a direction perpendicular to the axis of the piezoelectric element case 31 and is placed inside the body passage 23 to minimize the resistance to be generated in the measured fluid.

As shown in FIG. 6, the fitted part 312 is formed with a hollow portion 319 extending from the distal end face 312a along the axial direction (a vertical direction in FIG. 6) of the piezoelectric element case 31. The hollow portion 319 is formed along the outer peripheral surface of the pressure receiving part 314. Thus, the pressure receiving part 314 is connected to the fitted part 312 within the fitted part 312 and supported in a cantilever manner. The entire length L1 of the pressure receiving part 314 is longer by the length L2 of the hollow portion 319 than that of a conventional-type pressure receiving part extending in a cantilever manner from a distal end face of a fitted part not formed with the hollow portion 319. Thus, the pressure receiving part 314 is easily warped and deformed (vibrated) about its proximal end portion 314b functioning as a base point.

The hollow portion 319 extends to a position beyond the region where the small-diameter portion 312b exists, that is, to a position opposite the body passage 23 (the distal end face 312a of the fitted part 312) relative to the step portion 312c. Accordingly, the hollow portion 319 extends across the region on which the seal member 51 is mounted to prevent the stress of the seal member 51 from acting on the pressure receiving part 314.

The slit 318 is formed inside the pressure receiving part 314. In the piezoelectric element case 31, the piezoelectric plate 322 of the piezoelectric element 32 is inserted in the slit 318, and the piezoelectric plate 322 of and the inner wall of the slit 318 are adhered to each other with no gap therebetween. The piezoelectric element 32 is configured to detect the Karman vortices K1 and K2 in such a manner that the piezoelectric plate 322 is strained when the deformation (vibration) of the pressure receiving part 314 is transmitted to the piezoelectric plate 322. Thus, the sensitivity of the piezoelectric element 32 becomes higher as the amplitude of vibration (the deformation amount) of the pressure receiving part 314 is larger.

However, if the amplitude of vibration (the deformation amount) of the pressure receiving part 314 is too large, resonance may occur. The piezoelectric element 32 can detect the vibration if the piezoelectric plate 322 is deformed for example just by five one-hundredths of a millimeter. Therefore, as shown in FIGS. 5 and 8, the piezoelectric element case 31 is provided with a pair of ribs 313, 313 in the hollow portion 319 to reduce the deformation (vibration) of the pressure receiving part 314. The paired ribs 313, 313 are arranged symmetrically along a width direction of the pressure receiving part 314 (the axial direction of the body passage 23, the direction perpendicular to the axis of the piezoelectric element case 31, the horizontal direction in FIGS. 5 and 8), thereby dividing the hollow portion 319 into two. As shown in FIG. 8, the peripheral edge of each of the ribs 313, 313, excepting a portion located on the side close to the body passage 23 (on the side close to the distal end face 312a of the fitted part 312), is connected to the fitted part 312 and the pressure receiving part 314. The pair of ribs 313, 313 is configured to stretch the deformable pressure receiving part 314 to limit the deformation amount (the amplitude of vibration) of the pressure receiving part 314.

As shown in FIG. 6, the pressure receiving part 314 includes a distal end portion 314a placed inside the body passage 23, the distal end portion 314a having a smaller thickness than the proximal end portion 314b. Even in the body passage 23 designed with a small passage cross-sectional area because for instance a lower limit value of a measurable range of the vortex flowmeter 1 corresponds to a low flow rate, a sufficient clearance is formed between the pressure receiving part 314 and a passage surface 23a of the body passage 23, thereby enabling the pressure receiving part 314 to be deformed upon receiving the alternating stress from the Karman vortices K1 and K2. For example, in the body passage 23 designed with a large passage cross-sectional area because the lower limit value of the measurable range of the vortex flowmeter 1 corresponds to a high flow rate, the distal end portion 314a and the proximal end portion 314b may have the same thickness.

The flange 311 is provided at a rear end portion (an upper end portion in FIG. 3) of the fitted part 312, on the side opposite the body passage 23, to define the amount of insertion of the flow rate measuring unit 30 in the second insertion hole 26. The flange 311 is formed with through holes 316, 316 for insertion of fixing screws.

As shown in FIGS. 4 and 5, the flange 311 is provided with a recess 315 in an outer edge. As shown in FIG. 5, the recess 315 is located on the same axis with the pressure receiving part 314 and the pair of ribs 313, 313 and extends along the axial direction of the body passage 23. As shown in FIG. 1, the body case 2 is provided with a guide part 28 lateral to the second insertion hole 26. The guide part 28 is formed in a direction (a vertical direction in the figure) perpendicular to the axial direction of the body passage 23 and provided in parallel to the second insertion hole 26. Thus, when the recess 315 of the piezoelectric element case 31 engages with the guide part 28, the pressure receiving part 314 can be positioned with respect to the axis of the body passage 23.

As shown in FIG. 1, the second insertion hole 26 includes a fitting recess 26a configured to allow the fitted part 312 of the piezoelectric element case 312 to be fitted therein and a communicating portion 26d extending through the pressure receiving part 314. The fitting recess 26a includes a fitting hole 26b configured to allow the fitted part 312 to be fitted therein and a small-diameter hole 26c configured to allow the small-diameter portion 312b to be fitted therein. The fitting recess 26a thus supports the piezoelectric element case 31 at two points to prevent wobble of the flow rate measuring unit 30. The gap between the piezoelectric element case 31 and the inner wall of the second insertion hole 26 is sealed by the seal member 51. The communicating portion 26d has a circular or elliptical shape larger than a deformable region of the pressure receiving part 314 and thus does not contact with the pressure receiving part 314.

As shown in FIG. 1, the temperature sensing element 40 includes a temperature sensing case 41 and a temperature sensor 42 accommodated in this case 41.

Figure 9:
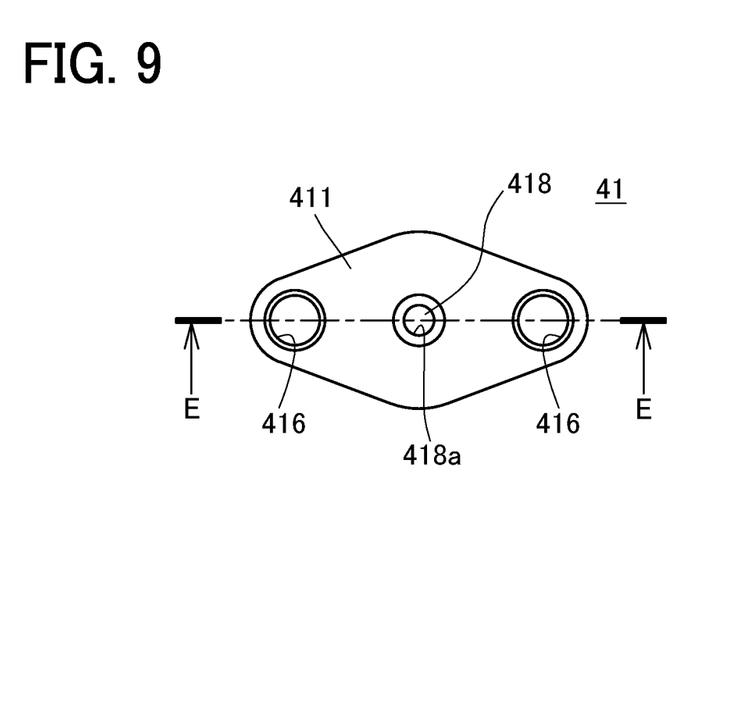
FIG. 9 is a top view of a temperature sensing case shown in FIG. 1.
Figure 10:
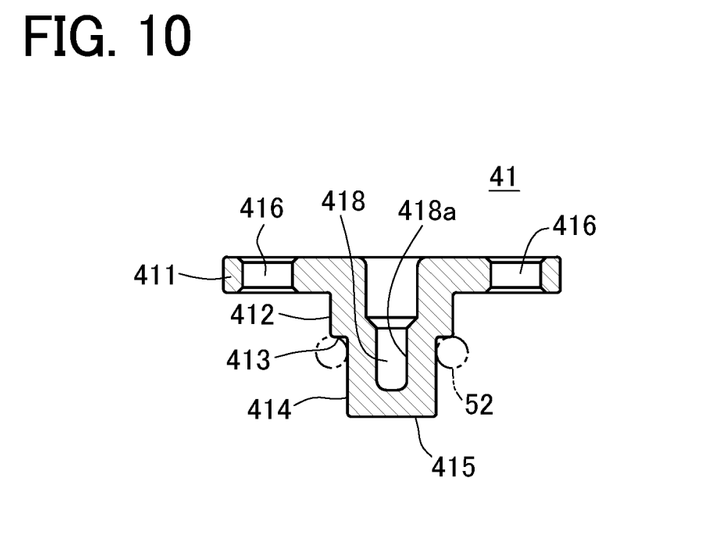
FIG. 10 is a cross-sectional view taken along E-E in FIG. 9.

FIG. 9 is a top view of the temperature sensing case 41 shown in FIG. 1. FIG. 10 is a cross-sectional view taken along E-E in FIG. 9. The temperature sensing case 41 is made of metal with high heat conductivity and high corrosion resistance, such as stainless steel.

The fitted part 412 of the temperature sensing case 41 shown in FIG. 10 has a columnar shape. The fitted part 412 is provided, as its end portion (a lower end portion in FIG. 10) located on the side close to the body passage 23, with a small-diameter portion 414 having a small diameter. Thus, a step portion 413 is circumferentially formed along the outer peripheral surface of the fitted part 412. In the temperature sensing case 41, the small-diameter portion 414 is mounted with a seal member 52, the movement of which is limited by the step portion 413. The flange 411 is provided at an end (an upper end in FIG. 10) of the fitted part 412, on the side opposite the body passage 23, to define the amount of insertion of the temperature sensing element 40 in the first insertion hole 27. As shown in FIG. 9, the flange 411 is formed with through holes 416, 416 for insertion of fixing screws. The temperature sensing case 41 is provided with an accommodating hole 418 in a columnar shape, which opens in the surface on the side opposite a distal end face 415 (the surface on the side opposite the body passage 23).

As shown in FIG. 1, the temperature sensor 42 is inserted in the accommodating hole 418 so as to contact with an inner wall 418a of the accommodating hole 418 and is adhered to the temperature sensing case 41 with an ultraviolet cure adhesive.

As shown in FIG. 1, the first insertion hole 27 includes a fitting recess 27a configured to allow the temperature sensing element 40 to be fitted therein and a communicating portion 27d allowing communication between the fitting recess 27a and the body passage 23. In the body case 2, the fitting recess 27a includes a fitting hole 27b and a small-diameter hole 27c configured to allow the fitted part 412 and the small-diameter portion 414 of the temperature sensing case 41 to be respectively inserted therein to support the temperature sensing element 40 at two points, thereby preventing wobble of the temperature sensing element 40. The gap between the temperature sensing element 40 and the inner wall of the first insertion hole 27 is sealed by the seal member 52.

The controller 17 is provided with a sensor board 3, a main board 4, and a display device 5. The sensor board 3 is connected to the piezoelectric element 32 of the flow rate measuring unit 30 through a pair of lead wires 10 and also connected to the temperature sensor 42 of the temperature sensing element 40 through a lead wire 11. The sensor board 3 is further connected to the main board 4 through a lead wire 9. On the main board 4, the display device 5 is mounted. The main board 4 is connected to a connector 8 through a lead wire 7 and hence connectable to an external device not shown for communication.

The sequence of assembling the vortex flowmeter 1 will be described below. The flow rate measuring unit 30 and the temperature sensing element 40 are first mounted in the body case 2. To be concrete, the annular seal member 51 is mounted on the small-diameter portion 312b of the flow rate measuring unit 30. Then, the recess 315 of the flow rate measuring unit 30 is engaged with the guide part 28 of the body case 2 and further the flow rate measuring unit 30 is pushed into the fitting recess 26a of the second insertion hole 26 by compressing the seal member 51. When the flow rate measuring unit 30 is inserted in the second insertion hole 26 until the flange 311 comes into contact with the body case 2, the fixing screws not shown are inserted in the through holes 316, 316 of the flange 311 and then tightened in the body case 2, thereby fastening the flow rate measuring unit 30 to the body case 2. The temperature sensing element 40 is also fastened to the body case 2 in a similar manner.

Successively, the pair of lead wires 10 connected to the flow rate measuring unit 30 and the lead wire 11 connected to the temperature sensor 42 are individually connected to the sensor board 3. The main board 4, the display device 5, and the connector 8 are attached to an upper cover 6A of the casing 6. The sensor board 3 is then connected to the main board 4 through the lead wire 9. After that, the upper cover 6A is capped on the body case 2 so as to match with an upper edge 2d thereof and fixed thereto with screws. This body case 2 is inserted in a lower cover 6B of the casing 6. Further, the body case 2 and the lower cover 6B are engaged integrally.

Subsequently, the first joint 12 and the second joint 13 are screwed into the body case 2 through the 0 rings 14 and 15. Assembling of the vortex flowmeter 1 is thus completed.

Since the flow rate measuring unit 30, the temperature sensing element 40, the sensor board 3, and the main board 4 can be attached to the body case 2 from above in the figure in the same direction, the vortex flowmeter 1 is easily assembled. The lead wires 10 and 11 are arranged within a cavity space defined between the body case 2 and the casing 6. Accordingly, there is no need to seal the lead wires 10 and 11 when the vortex flowmeter 1 is to be assembled. Further, the 0 rings 14 and 15 and the seal members 51 and 52 can provide a waterproof property of the controller 17. Thus, the assembling work is easy. Furthermore, when the flow rate measuring unit 30 and the temperature sensing element 40 are inserted respectively into the second insertion hole 26 and the first insertion hole 27, the seal members 51 and 52 are moved to and engaged in the corresponding step portions 312c and 413. The mounting state of the seal members 51 and 52 is therefore stable.

Next, the sequence of measuring the flow rate and the temperature using the vortex flowmeter 1 will be described below. As shown in FIG. 1, in the vortex flowmeter 1, the measured fluid flowing in the first passage 12b through the first port 12a is straightened by the first nozzle portion 24 and then flows in the body passage 23. This measured fluid is thereafter reduced in flow velocity by the second nozzle portion 25 and flows in the second passage 13b and then flows out therefrom through the second port 13a.

The measured fluid is caused to asymmetrically generate the Karman vortices K1 and K2 along the axial direction of the body passage 23 by the vortex generator 16. The alternating stress of the Karman vortices K1 and K2 acts on the pressure receiving part 314 of the flow rate measuring unit 30. When receiving the alternating stress acting on the distal end portion 314a, the pressure receiving part 314 vibrates (undergoes flexural deformation) about the proximal end portion 314b functioning as the base point. Upon receiving the vibration transmitted from the pressure receiving part 314, the piezoelectric plate 322 is warped, so that the piezoelectric element 32 outputs an analog signal according to the strain deformation of the piezoelectric plate 322 from the electrode part 321 to the sensor board 3.

The sensor board 3 converts the analog signal transmitted from the electrode part 321 of the piezoelectric element 32 into a digital signal. Specifically, the sensor board 3 converts an analog signal exceeding a threshold value into 1 and an analog signal not exceeding the threshold value into 0. In the main board 4, a program of a microcomputer is executed once the vortex flowmeter 1 is powered on. Upon receiving the digital signal from the sensor board 3, based on the program, the main board 4 detects the frequency of the digital signal and converts a flow rate into a numerical form. The display device 5 receives the flow rate converted into a numerical form from the main board 4 and displays it.

The vortex flowmeter 1 is configured to measure the temperature of the measured fluid by use of the temperature sensing element 40 in addition to measuring the flow rate. A part of the measured fluid flows in the first insertion hole 27, coming into contact with the temperature sensing case 41 of the temperature sensing element 40. The temperature sensing case 41 is made of metal with high heat conductivity and thus can be heated to the same temperature as the measured fluid. The temperature sensor 42 in contact with the temperature sensing case 41 measures the temperature of the temperature sensing case 41. The temperature sensing element 40 can therefore detect the temperature of the measured fluid with high responsiveness without being affected by outside air and others. Upon receipt of the information about the temperature of the measured fluid from the temperature sensor 42, the sensor board 3 transmits the information to the main board 4. This main board 4 causes the display device 5 to display the temperature of the measured fluid based on the information transmitted from the sensor board 3.

The piezoelectric element 32 and the temperature sensor 42 are respectively adhered to the piezoelectric element case 31 and the temperature sensing case 41. Accordingly, no gap occurs between the piezoelectric element 32 and the piezoelectric element case 31 and between the temperature sensor 42 and the temperature sensing case 41 due to the length of usage and the installation attitude of the vortex flowmeter 1. The vortex flowmeter 1 can thus maintain the reliability of a flow rate measuring function and a temperature sensing function over a long period.

It is to be noted that the display device 5 may be configured to make changeable the orientation of displaying a flow rate and a temperature (e.g., vertical text and horizontal text) according to the installation attitude of the vortex flowmeter 1. This makes it easy and convenient for a user to look a displayed content.

The vortex flowmeter 1 in the present embodiment described as above includes the vortex generator 16 and the flow rate measuring unit 30 placed downstream of the vortex generator 16 and configured to detect the Karman vortices K1 and K2 generated by the vortex generator 16 to measure a flow rate. The vortex flowmeter 1 further includes: the temperature sensing element 40 including the metal temperature sensing case 41 and the temperature sensor 42 adhered to the temperature sensing case 41 with an adhesive; the body case 2 including the body passage 23 in which the vortex generator 16 is placed and the first insertion hole 27 in which the temperature sensing element 40 is inserted, the body passage 23 and the first insertion hole 27 being communicated with each other; and the seal member 52 mounted to seal between the temperature sensing element 40 and the inner wall of the first insertion hole 27. The temperature sensing element 40 inserted in the first insertion hole 27 includes the distal end face 415 located on the side close to the body passage 23, the distal end face 415 being located at a position more outside than the passage surface 23a of the body passage 23 in the radial direction of the body passage 23.

The vortex flowmeter 1 configured as above, in which the temperature sensing element 40 is installed in the body case 2 without protruding into the body passage 23, is less likely to affect the generation and the detection of vortices. This configuration can suppress the influence on the flow rate measuring function even though the temperature sensing element 40 is placed on the body passage 23. Further, in the vortex flowmeter 1, the temperature sensor 42 is adhered to the metal temperature sensing case 41 with an adhesive. This configuration is hardly to generate a gap between the temperature sensor 42 and the temperature sensing case 41 even after a long-term use. Thus, the temperature sensing element 40 can detect the temperature of the measured fluid with high responsiveness. The vortex flowmeter 1 can therefore enhance the reliability of the temperature sensing function.

In the vortex flowmeter 1 in the present embodiment, the temperature sensing case 41 includes the accommodating hole 418 configured to accommodate the temperature sensor 42, the accommodating hole 418 extending in the axial direction of the temperature sensing case 41. The temperature sensor 42 is adhered in contact with the inner wall 418a of the accommodating hole 418.

In the above vortex flowmeter 1, the temperature sensor 42 can be placed as close to the body passage 23 as possible, so that the temperature sensor 42 can detect the temperature of the measured fluid with high responsiveness. Further, since the temperature sensor 42 and the inner wall 418a of the accommodating hole 418 are adhered to each other, it is possible to prevent a gap from occurring between the temperature sensor 42 and the temperature sensing case 41 due to the length of usage of the temperature sensing element 40, the installation attitude of the vortex flowmeter 1, and other causes.

In the vortex flowmeter 1 in the present embodiment, the temperature sensing element 40 is placed upstream of the vortex generator 16. According to this vortex flowmeter 1, the temperature sensing element 40 has no influence on the generation and detection of the Karman vortices K1 and K2. The vortex flowmeter 1 can therefore achieve the flow rate measuring accuracy at the same level as a vortex flowmeter not provided with the temperature sensing element 40.

According to the present embodiment, therefore, the vortex flowmeter can be provided capable of enhancing the reliability of a temperature sensing function while suppressing the influence on the flow rate measuring function.

Moreover, the vortex flowmeter 1 in the present embodiment includes: the body case 2 including the body passage 23; the vortex generator 16 placed in the body passage 23; and the flow rate measuring unit 30 placed downstream of the vortex generator 16 and configured to detect the Karman vortices K1 and K2 generated by the vortex generator 16 to measure a flow rate. In the vortex flowmeter 1, the flow rate measuring unit 30 includes the piezoelectric element 32 and the piezoelectric element case 31. The piezoelectric element case 31 includes: the fitted part 312 fitted in the body case 2; the pressure receiving part 314 protruding out from the distal end face 312a of the fitted part 312, the distal end face 312a being located close to the body passage 23, so that the pressure receiving part 314 is placed inside the body passage 23; the hollow portion 319 formed in the fitted part 312 along the axial direction of the piezoelectric element case 31 to separate or isolate the fitted part 312 and the pressure receiving part 314 from each other; and the slit 318 provided inside the pressure receiving part 314 and configured to accommodate the piezoelectric element 32.

The vortex flowmeter 1 configured as above can be provided with the pressure receiving part 314 having the length L1 elongated owing to the hollow portion 319 without changing the protruding length of the pressure receiving part 314 from the distal end face 312a of the fitted part 312. Accordingly, even when the measured fluid flows at a low flow rate and the alternating stress of the Karman vortices K1 and K2 is small, the pressure receiving part 314 is easy to vibrate (undergoes flexural deformation) in response to the Karman vortices K1 and K2 generated by the vortex generator 16, enabling the piezoelectric element 32 to detect the Karman vortices K1 and K2. According to the vortex flowmeter 1 in the present embodiment as described above, the piezoelectric element case 31 simply provided with the hollow portion 319 enables the sensitivity of the piezoelectric element 32 to be enhanced. This configuration can enhance the flow rate measuring accuracy while suppressing an increase in size.

In the vortex flowmeter 1 in the present embodiment, furthermore, the body case 2 includes the second insertion hole 26 in which the flow rate measuring unit 30 is inserted. The vortex flowmeter 1 further includes the seal member 51 mounted to seal between the body case 2 and the flow rate measuring unit 30 (between the outer peripheral surface of the fitted part 312 and the inner wall of the second insertion hole 26). The hollow portion 319 is located more radially inside than a mounting position of the seal member 51.

In the vortex flowmeter 1 configured as above, the stress of the seal member 51 is blocked by the hollow portion 319 and not transmitted to the pressure receiving part 314. Thus, the flow rate measuring unit 30 can detect the Karman vortices K1 and K2 without being affected by the stress of the seal member 51.

In the vortex flowmeter 1 in the present embodiment, the piezoelectric element case 31 includes the pair of ribs 313, 313 each provided across the hollow portion 319. The pair of ribs 313, 313 are arranged along the axial direction of the body passage 23.

In the vortex flowmeter 1 configured as above, when the pressure receiving part 314 vibrates in response to the Karman vortices K1 and K2, the pair of ribs 313, 313 stretches the pressure receiving part 314 to limit the amplitude of vibration (the deformation amount) of the pressure receiving part 314. This configuration can prevent resonance of the pressure receiving part 314 and enhance the flow rate measuring accuracy.

In this respect, the inventors carried out an experiment to investigate sensor characteristics in an example corresponding to the vortex flowmeter 1 of the present embodiment and in a comparative example corresponding to a conventional vortex flowmeter.

Figure 11:
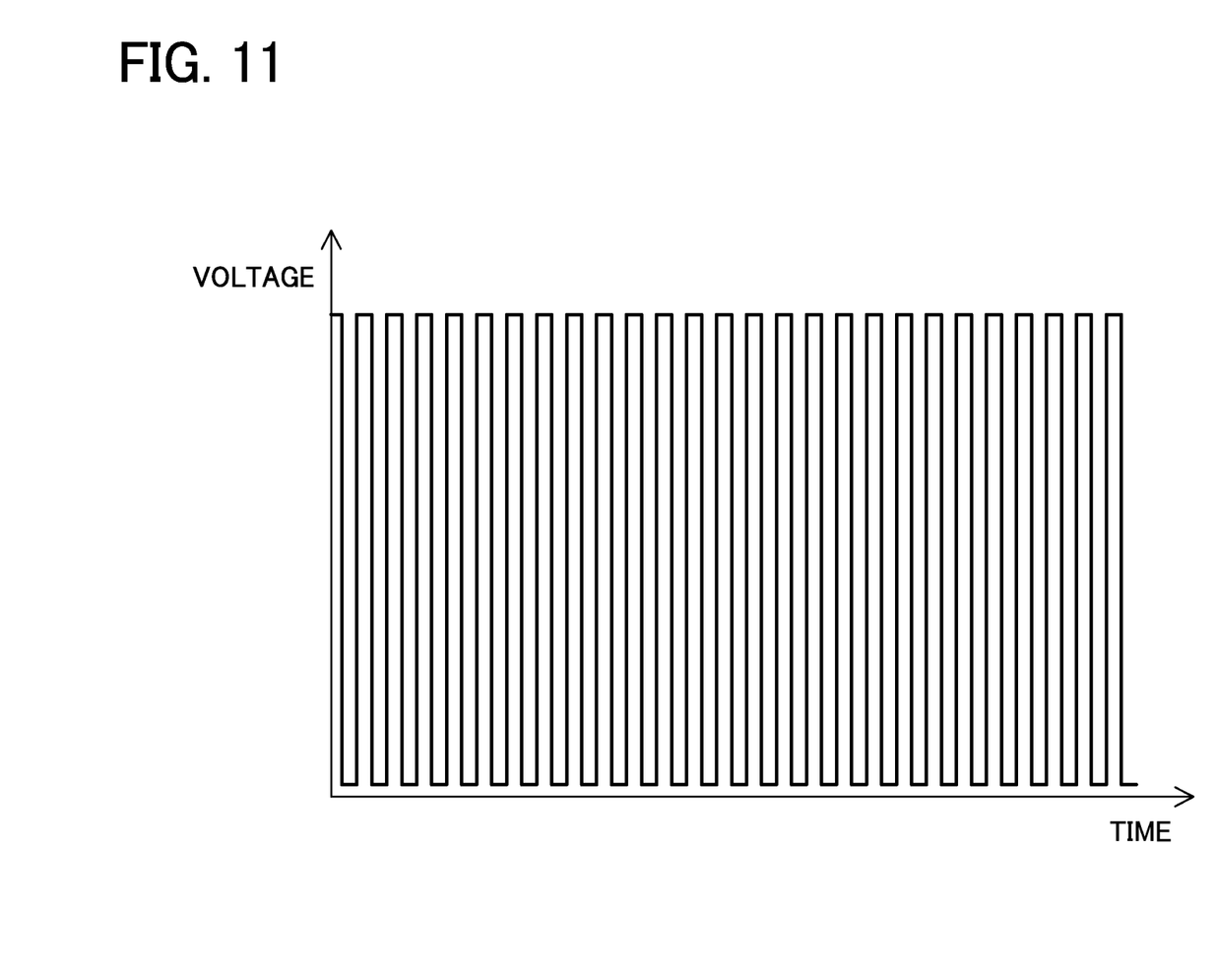
FIG. 11 is a graph showing voltage waveforms of a voltage signal measured using an example.
Figure 12:
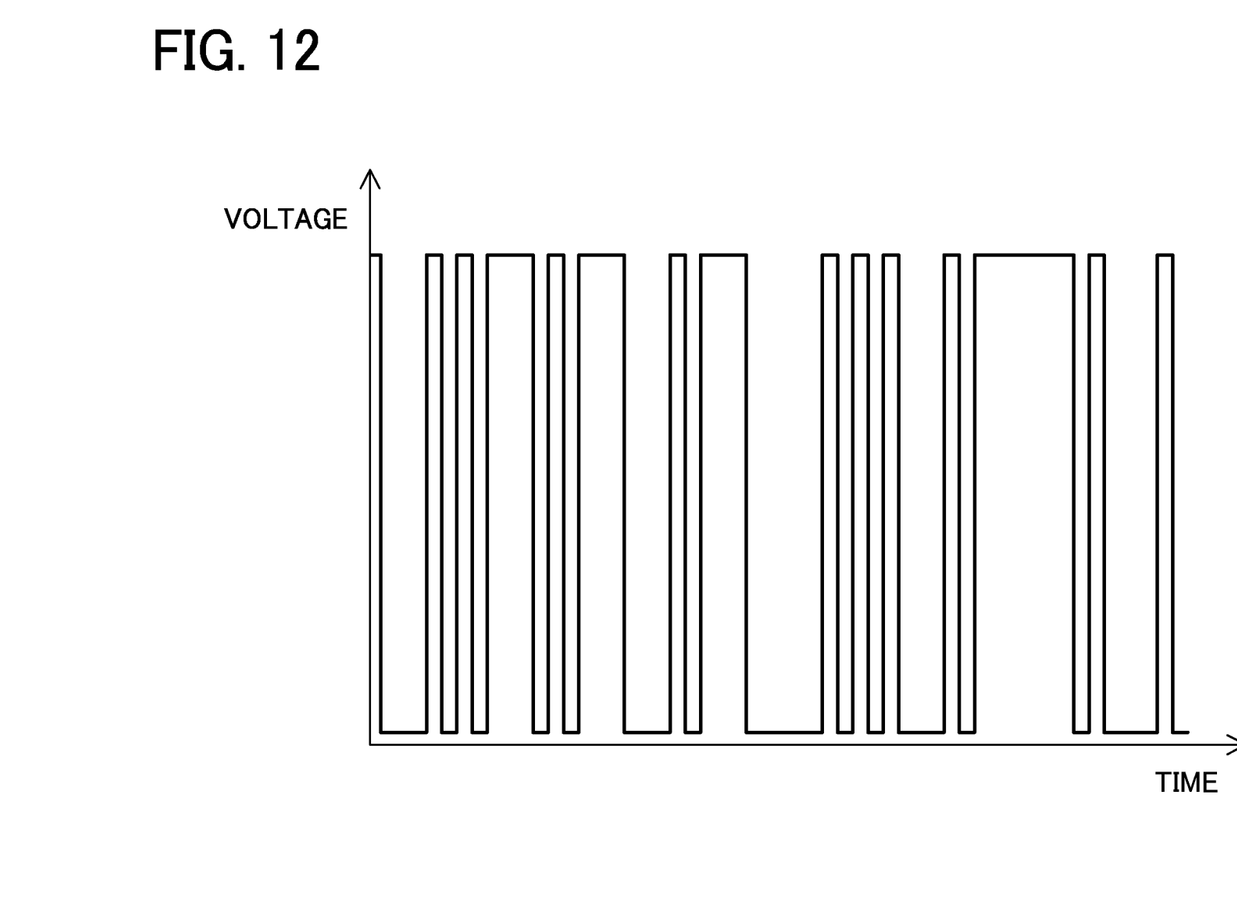
FIG. 12 is a graph showing voltage waveforms of a voltage signal measured using a comparative example.

The example is identical in structure to the comparative example excepting the shape of the piezoelectric element case 31. The piezoelectric element case 31 of the example is provided with the hollow portion 319 between the fitted part 312 and the pressure receiving part 314, whereas a piezoelectric element case of the comparative example is provided with no hollow portion between a fitted part and a pressure receiving part. Except for this regard, the piezoelectric element case of the comparative example is identical in structure to the piezoelectric element case 31 of the example. The experiment was executed by use of a flow control valve, a flow sensor, a vortex flowmeter, and a controller. The controller is operated to control the flow control valve to adjust a measurement value of the flow sensor to 0.4 L/min and measures a voltage signal (a digital signal) rectified by the sensor board 3 in the example and the comparative example. FIG. 11 shows a voltage waveform of the voltage signal measured by use of the example. FIG. 12 shows a voltage waveform of the voltage signal measured by use of the comparative example. In FIGS. 11 and 12, a vertical axis indicates voltage and a horizontal axis indicates time.

For instance, as shown in FIGS. 11 and 12, the example develops an output voltage of more uniform waveform and detects the output voltage in a greater number of times per unit time than the comparative example. Specifically, as shown in FIG. 11, in the example, every time the alternating stress of the Karman vortices K1 and K2 acts on the pressure receiving part 314 of the piezoelectric element case 31, the analog signal output from the piezoelectric element 32 exceeds the threshold value of the sensor board 3, i.e., the analog signal continuously exceeds the threshold value. Thus, the voltage waveform of the voltage signal (the digital signal) rectified by the sensor board 3 exhibits a periodic pattern. In contrast, as shown in FIG. 12, in the comparative example, even when the alternating stress of the Karman vortices K1 and K2 acts on the pressure receiving part of the piezoelectric element case, the analog signal output from the piezoelectric element may not exceed the threshold value of the sensor board. Thus, the voltage waveform of the voltage signal (the digital signal) rectified by the sensor board exhibits a non-uniform pattern. The above results indicate that the pressure receiving part 314 of the piezoelectric element case 31 of the example is easier to be deformed when applied with the alternating stress of the Karman vortices K1 and K2 and the piezoelectric element 32 is more highly responsive than in the comparative example. It is thus revealed that the presence of the hollow portion 319 in the piezoelectric element case 31 enables enhancement of the sensitivity of the vortex flowmeter 1.

According to the present embodiment, consequently, the vortex flowmeter 1 can be provided capable of enhancing the flow rate measuring accuracy while suppressing an increase in size.

The present invention is not limited to the aforementioned embodiment and may be embodied in other various forms.

(1) For example, in the foregoing embodiment, the vortex generator 16 has a hexagonal cross-sectional shape. As an alternative, the vortex generator 16 may be designed for example with its both ends located on upstream and downstream sides each having a circular-arc shape or with any different cross-sectional shape (e.g., a pentagonal cross-sectional shape) as long as it can generate Karman vortices K1 and K2.

(2) For example, the piezoelectric element case 31 may contain glass fibers. However, the piezoelectric element case 31 containing no glass fiber is softer and easier to warp than the piezoelectric element case containing glass fibers. Thus, the piezoelectric element case 31 containing no glass fiber is easy to be deformed by the Karman vortices K1 and K2 generated in the measured fluid flowing at a low flow rate. This configuration contributes to an increase in the sensitivity of the flow rate measuring unit 30.

(3) In the forgoing embodiment, the temperature sensing element 40 is inserted in the first insertion hole 27 so that the distal end face 415 is located more outside than the passage surface 23a of the body passage 23 in the radial direction of the body passage 23. As an alternative, the temperature sensing element 40 may be inserted in the first insertion hole 27 so that the distal end face 415 is located flush with the passage surface 23a of the body passage 23. In this case, the distal end face 415 is preferably designed with a shape conformable to the shape of the passage surface 23a so as not to protrude into the body passage 23.

(4) For example, the pair of ribs 313, 313 may be dispensed with.

REFERENCE SIGNS LIST

1 Vortex flowmeter
2 Body case
16 Vortex generator
26 Second insertion hole
30 Flow rate measuring unit
31 Piezoelectric element case
32 Piezoelectric element
312 Fitted part
313 Rib
314 Pressure receiving part
319 Hollow portion
51 Seal member

The invention claimed is:

1. A vortex flowmeter comprising:
a body case including a body passage;
a vortex generator placed in the body passage; and
a flow rate measuring unit placed downstream of the vortex generator and configured to detect a Karman vortex generated by the vortex generator to measure a flow rate, wherein
the flow rate measuring unit comprises:
    a piezoelectric element and a piezoelectric element case, and
the piezoelectric element case comprises:
    a fitted part fitted in the body case;
    a pressure receiving part protruding out from a distal end face of the fitted part, the distal end face being located close to the body passage, so that the pressure receiving part is placed inside the body passage;
    a hollow portion extending in from the distal end face of the fitted part along an axial direction of the piezoelectric element case to separate the fitted part and the pressure receiving part from each other; and
    a slit provided inside the pressure receiving part and configured to accommodate the piezoelectric element.

2. The vortex flowmeter according to claim 1, wherein
the body case includes an insertion hole in which the flow rate measuring unit is inserted,
the vortex flowmeter includes a seal member mounted to seal between the body case and the flow rate measuring unit, and
the hollow portion is located more radially inside than a mounting position of the seal member.

3. The vortex flowmeter according to claim 1, wherein
the piezoelectric element case includes a pair of ribs provided across the hollow portion, and
the pair of ribs are arranged along an axial direction of the body passage.

4. The vortex flowmeter according to claim 2, wherein
the piezoelectric element case includes a pair of ribs provided across the hollow portion, and
the pair of ribs are arranged along an axial direction of the body passage.

* * * * *